Patented Apr. 6, 1937

2,075,971

UNITED STATES PATENT OFFICE 2,075,971

MANUFACTURE OF PHENYL MERCURY ACETATE AND PHENYL MERCURY HYDROXIDE

Louis S. Bake, Penns Grove, N. J., assignor to E. I. du Pont de Nemours & Company, Wilmington, Del., a corporation of Delaware No Drawing. Application February 13, 1935, Serial No. 6,390

9 Claims. (Cl. 260—13)

This invention relates to an improved method for the manufacture of phenyl mercury acetate and phenyl mercury hydroxide.

Phenyl mercury acetate and phenyl mercury hydroxide are well known and valuable compounds. Various methods for preparing these compounds have been proposed. One of the most common methods comprises reacting mercury acetate with benzene either in the absence or in the presence of acetic acid and purifying the resulting phenyl mercury acetate.

These methods have proved to be expensive, the reaction is generally incomplete, the yields are generally low, the product is impure and contains large proportions of the phenyl dimercury diacetate.

Phenyl mercury hydroxide has been prepared by reacting phenyl mercury chloride with silver hydroxide in alcoholic solution. This method is extremely expensive and is not practical for commercial use.

An object of the present invention is to provide an improved method for the preparation of phenyl mercury acetate and phenyl mercury hydroxide. A further object is to provide such a method employing cheaper and more readily available starting materials. A still further object is to provide such a method which is cheap and simple to operate and which gives higher yields of purer product than the methods which have been employed heretofore. Other objects are to advance the art. Still other objects will appear hereinafter.

These objects may be accomplished in accordance with my invention which comprises mixing one mol. of mercuric oxide with at least one mol. of acetic acid and at least three mols of benzene and then heating the mixture in a closed reaction vessel at a temperature of between 110° and 160° C. until the reaction is complete, whereupon phenyl mercury acetate is produced. The phenyl mercury acetate may be recovered by distilling off the excess benzene and acetic acid or by drowning the reaction mass in water, evaporating off the benzene and filtering the acetate from the resulting slurry. The phenyl mercury acetate is treated with an equivalent amount of sodium hydroxide in aqueous solution whereupon phenyl mercury hydroxide is produced and precipitated.

In preparing the phenyl mercury acetate, I have found that from one to about four mols of acetic acid and from about three to about fifteen mols of benzene for each mol. of the mercuric oxide produces satisfactory yields. Larger excesses of acetic acid and benzene may be employed without, however, obtaining any advantage. In fact, if very much larger excesses of acetic acid and benzene are employed, the yield is decreased and the process becomes very much more expensive due to the long distillation necessary to remove the excess ingredients.

During the reaction, substantial amounts of phenyl dimercury diacetate are produced. This dimercury diacetate is formed at the expense of the phenyl monomercury acetate hence reducing the yields of the desired compound. Furthermore the dimercury diacetate is an undesirable impurity. I have found that, when from about 1.5 to about 2 mols of acetic acid and about 10 to about 13 mols of benzene for each mol. of the mercuric oxide are employed, the formation of the dimercury diacetate is reduced to the minimum and the yield of the phenyl mercury acetate is accordingly increased. This constitutes the preferred embodiment of my invention. If the acetic acid is employed in an amount less than 1.5 mols and if the benzene is employed in an amount less than about 10 mols, the amount of dimercury diacetate is increased.

The preparation of the phenyl mercury acetate is preferably carried out at temperatures of from about 120 to 160° C. At these temperatures, superatmospheric pressures are developed in the reaction vessel. Preferably, the size of the charge in the reaction vessel is such that pressures of about 30 lbs. to 110 lbs. per sq. in. are developed within the reaction vessel. At these temperatures and pressures, the reaction is generally complete in about two hours, with stirring. Longer periods of time up to about 7 hours may be employed, if desired, but without material advantage, in the majority of cases.

Also, if desired, acetic anhydride may be employed in place of the acetic acid. Smaller amounts of acetic anhydride will be generally employed as one mol. of acetic anhydride is approximately equivalent to two mols of acetic acid.

In order to more clearly illustrate my invention, the preferred modes of carrying the same into effect and the advantageous results to be obtained thereby, the following examples are given:

Example I 500 parts of mercuric oxide, (1 mol.); 138.5 parts of acetic acid (1 mol.); 2,340 parts of benzene (13.0 mols), were mixed and heated with agitation, in a stainless steel autoclave, at 110° C. for from two to seven hours. After removal of the excess acetic acid and benzene, a yield of 95% of mercury compound was obtained. This product contained 40.5% of the phenyl dimercury diacetate, the rest being the phenyl monomercury monoacetate.

*Example II*

The procedure of Example I was employed employing the same ingredients in the same proportions except that the temperature employed was 160° C. and the reaction was complete in from one to three hours. The yield was about 95% of the mercury compound. The product contained about 42.3% of the dimercury diacetate, the rest being the phenyl monomercury acetate.

*Example III*

|  | Parts |
|---|---|
| Mercuric oxide (1 mol.) | 500 |
| Acetic acid (2.0 mols) | 277 |
| Benzene (3.0 mols) | 540 | were heated as in Example I, for seven hours at 120° C. The yield was about 95% of the mercury compound. This compound contained about 74.3% of the dimercury diacetate, the rest being the monomercury acetate.

*Example IV*

|  | Parts |
|---|---|
| Mercuric oxide (1 mol.) | 500 |
| Acetic acid (1.5 mols) | 208 |
| Benzene (13.0 mols) | 2340 | were heated for two hours at about 120° C. in a stainless steel autoclave with agitation. The yield of mercury compound was about 95% of theory of which 18.5% was the dimercury diacetate and the rest was the phenyl monomercury monoacetate. The pressure developed during the reaction was about 30# per square inch. When the time was extended for various periods up to seven hours and when temperatures up to 160° C. were employed, substantially the same results were obtained except that the pressures were higher, rising up to about 110 lbs. per square inch.

*Example V*

|  | Parts |
|---|---|
| Mercuric oxide (1 mol.) | 400 |
| Acetic acid (4 mols) | 443 |
| Benzene (13 mols) | 1900 | were mixed and reacted under the conditions of Example IV. The yield of mercury compound was 95% of theory of which 18% was the dimercury diacetate, the rest being the monomercury monoacetate. Increase in temperatures, time of reaction and pressures, as in Example IV, did not materially affect the results obtained.

*Example VI*

|  | Parts |
|---|---|
| Mercuric oxide (1 mol.) | 630 |
| Acetic anhydride (1 mol.) | 297 |
| Benzene (13 mols) | 2950 | were heated for seven hours at 120° C. under the conditions of Example IV. This produced a yield of mercury compound equivalent to about 95% of theory of which 24.7% was the dimercury diacetate, the rest being the monomercury monoacetate. Increase in temperatures and pressures did not materially affect the results.

*Example VII*

|  | Parts |
|---|---|
| Mercuric oxide (1 mol.) | 630 |
| Acetic anhydride (1 mol.) | 300 |
| Benzene (9.7 mols) | 2200 | were heated for seven hours at 120° C. The yield was about 95% of theory. The product contained about 16% of the dimercury diacetate and about 84% of the monomercury monoacetate.

The above examples are illustrative only. It will be readily apparent that variations may be made in the proportions of acetic acid and benzene employed as well as in the temperatures and pressures. It will also be apparent that acetic anhydride is substantially equivalent to 2 mols of acetic acid in the reaction. Accordingly, when I refer to acetic acid in the claims it will be understood that this term includes an equivalent amount of acetic anhydride.

As has been heretofore pointed out, the phenyl mercury acetate may be separated from the reaction mass by distillation of the benzene and acetic acid or by drowning in water with subsequent evaporation of the benzene. I have found that the reaction product comprising phenyl mercury acetate, phenyl dimercury diacetate, acetic acid and benzene may be treated with an aqueous solution of caustic alkali, such as sodium hydroxide. The amount of caustic alkali should be equivalent or slightly in excess of the acetic acid originally employed in the reaction. This caustic alkali solution is added slowly, with agitation. The benzene is then evaporated off and the resultant slurry of phenyl mercury hydroxide is filtered, and then washed twice to free it from most of the sodium acetate. By this procedure, yields of approximately 85% of the phenyl mercury hydroxide, based on the mercuric oxide originally employed, are obtained. The reaction between the caustic alkali and the phenyl mercury acetate will take place at ordinary room temperatures. However, if desired, higher temperatures, such as reflux temperatures, may be employed.

The phenyl mercury hydroxide may be prepared by first distilling off the benzene from the reaction mass, adding water and caustic alkali and then filtering off the phenyl mercury hydroxide. However, this latter procedure is less desirable as the product, resulting from the distillation of the benzene, is slightly gummy and does not readily disperse in the water.

The phenyl mercury hydroxide may also be prepared by separating the phenyl mercury acetate from the reaction mass and then adding it to water with agitation to make a slurry and finally adding the caustic alkali to such slurry. This latter process, however, is the least desirable as it involves the expense of first separating the phenyl mercury acetate from the reaction mass without producing a materially better product.

While I have disclosed the preferred embodiments of my invention, it will be readily apparent to those skilled in the art that many variations and modifications may be made therein without departing from the spirit of my invention. Accordingly, the scope of my invention is to be limited solely by the appended claims construed as broadly as is permissible in view of the prior art.

I claim:
1. The method which comprises the steps of mixing 1 mol. of mercuric oxide with at least 1 mol. of acetic acid and at least 3 mols of benzene and then heating to a temperature of about 120° to about 160° C. at pressures of about 30 to about 110 pounds per square inch until the reaction is complete.

2. The method which comprises the steps of mixing 1 mol. of mercuric oxide with from 1 to about 4 mols of acetic acid and from about 10 to about 15 mols of benzene and then heating to a temperature of about 120° to about 160° C. at pressures of about 30 to about 110 pounds per square inch until the reaction is complete.

3. The method which comprises the steps of mixing 1 mol. of mercuric oxide with about 1.5 to about 2 mols of acetic acid and about 10 to about 13 mols of benzene and then heating to a temperature of about 120° to about 160° C. at pressures of about 30 to about 110 pounds per square inch until the reaction is complete.

4. The method which comprises the steps of mixing 1 mol. of mercuric oxide with at least 1 mol. of acetic acid and at least 3 mols of benzene and then heating to a temperature of about 120° to about 160° C. at pressures of about 30 to about 110 pounds per square inch until the reaction is complete, and then adding to the reaction mass an aqueous solution of a caustic alkali in an amount equivalent to the acetic acid employed, and recovering the phenyl mercury hydroxide.

5. The method which comprises the steps of mixing 1 mol. of mercuric oxide with from 1 to about 4 mols of acetic acid and from 3 to about 15 mols of benzene and then heating to a temperature of about 120° to about 160° C. at pressures of about 30 to about 110 pounds per square inch until the reaction is complete, and then adding to the reaction mass an aqueous solution of a caustic alkali in an amount equivalent to the acetic acid employed, and recovering the phenyl mercury hydroxide.

6. The method which comprises the steps of mixing 1 mol. of mercuric oxide with about 1.5 to about 2 mols of acetic acid and about 10 to about 13 mols of benzene and then heating to a temperature of about 120° to about 160° C. at pressures of about 30 to about 110 pounds per square inch until the reaction is complete, and then adding to the reaction mass an aqueous solution of a caustic alkali in an amount equivalent to the acetic acid employed, and recovering the phenyl mercury hydroxide.

7. The method which comprises the steps of mixing 1 mol. of mercuric oxide with at least 1 mol. of acetic acid and at least 3 mols of benzene and then heating to a temperature of about 120° to about 160° C. at pressures of about 30 to about 110 pounds per square inch until the reaction is complete, and then adding to the reaction mass an aqueous solution of sodium hydroxide in an amount equivalent to the acetic acid employed, and recovering the phenyl mercury hydroxide.

8. The method which comprises the steps of mixing 1 mol. of mercuric oxide with from 1 to about 4 mols of acetic acid, and from 3 to about 15 mols of benzene and then heating to a temperature of about 120° to about 160° C. at pressures of about 30 to about 110 pounds per square inch until the reaction is complete, and then adding to the reaction mass an aqueous solution of sodium hydroxide in an amount equivalent to the acetic acid employed, and recovering the phenyl mercury hydroxide.

9. The method which comprises the steps of mixing 1 mol. of mercuric oxide with about 1.5 to about 2 mols of acetic acid and about 10 to about 13 mols of benzene and then heating to a temperature of about 120° to about 160° C. at pressures of about 30 to about 110 pounds per square inch until the reaction is complete, and then adding to the reaction mass an aqueous solution of sodium hydroxide in an amount equivalent to the acetic acid employed, and recovering the phenyl mercury hydroxide.

LOUIS S. BAKE.